F. G. ATKINSON.
Barrel-Stave.
No. 209,744.   Patented Nov. 12, 1878.
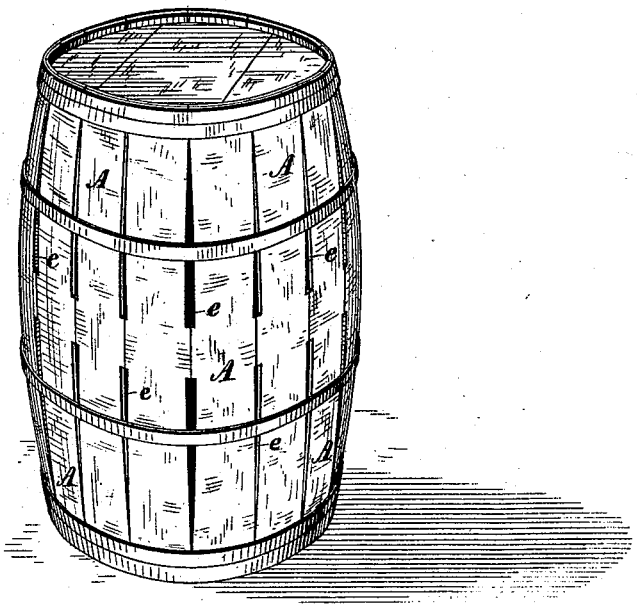
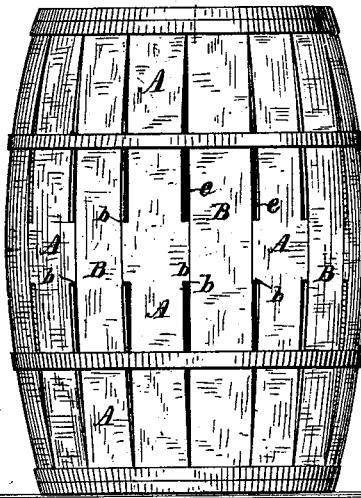

UNITED STATES PATENT OFFICE.

FREDERICK G. ATKINSON, OF SUFFOLK, VIRGINIA.

IMPROVEMENT IN BARREL-STAVES.

Specification forming part of Letters Patent No. 209,744, dated November 12, 1878; application filed October 19, 1878.

*To all whom it may concern:*

Be it known that I, FREDERICK G. ATKINSON, of Suffolk, in the county of Nansemond and State of Virginia, have invented certain new and useful Improvements in Barrel-Staves; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to barrel-staves; and consists in constructing the same with parallel edges, and providing on each side, at or near the center of the stave, shoulders, in such a manner that when the staves are set up so as to form a barrel, these shoulders, impinging against each other, spread or bulge out the center of the barrel in the proper shape, and at the same time form openings or ventilating-apertures around the barrel.

In the drawings, Figure 1 is a perspective view of a barrel composed in whole of my improved staves. Fig. 2 is a side elevation of a barrel formed in part of the same. Fig. 3 is a side view of stave, showing parallel edges and shoulders. Fig. 4 is an end view of same. Fig. 5 is an end view of two staves, showing the shoulders impinging against each other; and Fig. 6 is a side view of modified form of stave.

The stave A is constructed from a plain or rectangular piece of board of the requisite length, width, and thickness, as shown in dotted lines, Figs. 3 and 6, by cutting off the edge or edges square from the ends of the board inward to a point near the center thereof, as at *a*. This is accomplished in the best and cheapest manner by means of a pair of circular or jig saws or cutters placed sufficiently distant from each other to admit of a sufficient width of material remaining on each end of the stave to pass between them. The edges, being sawed or cut off, form shoulders *b b*. The edge-surface of these shoulders or projections may be square or beveled, as shown at *c*, Fig. 4, the bevel being made by means of a pair of saws or cutters placed at the proper incline, or they may be provided with tongue and groove, as shown at *d*, Fig. 5, formed by revolving or "rose" cutters. This latter form I prefer to adopt in the manufacture of my improved barrel-staves, as the joint formed by the contact of contiguous shoulders forms a lock or brace, preventing the barrel from being spread or pressed out of shape.

It is obvious that the object of my invention is also secured by sawing or cutting off one portion only of each edge, as shown at Fig. 6, the shoulder *b* on each side being formed by cutting off a portion of the edge, commencing on diagonally-opposite corners *f* of the blank or rectangular-shaped board, and cutting off each of the opposite edges to within a short distance of the center of the board.

The projecting spreading shoulders *b b* cause the staves to be wider in the center than at each end thereof, and, when set up and crowded together by means of ordinary heads and hoops of wood or metal, will form a barrel provided with a double row or series of ventilating-apertures, *e e*, Fig. 1, the staves being grooved, in the usual manner, near one or both ends to receive the heads.

In manufacturing barrels I employ staves, as above described, entirely, or I alternate the same with plain straight staves B of parallel width the entire length, as shown in Fig. 2.

I am aware that barrels have been made having near the contracted ends openings formed by recesses made in the edges of adjoining staves; but these are formed from the ordinary curved barrel-staves, and, because of their peculiar construction, are more costly than the common form of close barrel-stave, inasmuch as the formation of the notches or recesses requires a separate handling in their manufacture.

I am also aware that staves having paralled edges and of the same size from end to end have been heretofore employed in the manufacture of barrels, the requisite bulge and apertures being given to the barrel either by means of an internal hoop running around the center of the barrel, and larger in circumference than the end openings of the barrel, or by means of an external hoop having internally-projecting corrugations or projections, which fit or rest in the spread-open joint formed by the edges of the bulged parallel-edged barrel-stave.

A great objection to barrels having an internal or brace hoop, by which ventilating-apertures are formed between the staves, is that the hoop forms a projecting surface inside of the barrel, by which the contained fruit or vegetable is bruised and otherwise injured.

Having thus fully described my invention, what I claim as new, and desire to secure by Letters Patent, is—

A barrel-stave having the opposite edges parallel to each other, and provided at or near its center with a projecting spreading shoulder or shoulders upon one or both edges thereof, as and for the purposes set forth.

In testimony that I claim the foregoing as my own I affix my signature in presence of two witnesses.

FREDK. G. ATKINSON.

Witnesses:
JAMES E. WAUGH,
W. L. VAN DERLIP.